(12) United States Patent
Marguet et al.

(10) Patent No.: US 11,958,147 B2
(45) Date of Patent: Apr. 16, 2024

(54) MANUFACTURING METHOD FOR A TITANIUM HEAT EXCHANGER

(71) Applicants: Airbus SAS, Blagnac (FR); Airbus Operations SAS, Toulouse (FR)

(72) Inventors: Benoit Marguet, Blagnac (FR); César Garnier, Toulouse (FR); Pascal Saccona, Toulouse (FR)

(73) Assignees: AIRBUS SAS, Blagnac (FR); AIRBUS OPERATIONS SAS, Toulouse (FR)

( * ) Notice: Subject to any disclaimer, the term of this patent is extended or adjusted under 35 U.S.C. 154(b) by 545 days.

(21) Appl. No.: 17/111,119

(22) Filed: Dec. 3, 2020

(65) Prior Publication Data
US 2021/0170534 A1 Jun. 10, 2021

(30) Foreign Application Priority Data
Dec. 5, 2019 (FR) ...................................... 1913817

(51) Int. Cl.
*B23P 15/26* (2006.01)
*B23K 11/08* (2006.01)
*B23K 37/06* (2006.01)
*F28F 21/08* (2006.01)
*B23K 101/14* (2006.01)
*B23K 103/14* (2006.01)

(52) U.S. Cl.
CPC ............. *B23P 15/26* (2013.01); *B23K 11/08* (2013.01); *B23K 37/06* (2013.01); *F28F 21/086* (2013.01); *B23K 2101/14* (2018.08); *B23K 2103/14* (2018.08)

(58) Field of Classification Search
CPC .. B21D 53/045; B21D 53/04; B23K 2101/14; B23K 2101/18; B23K 15/0073; B23K 15/0066; B23K 15/0053; F28F 2275/06; F28F 2275/061–068
See application file for complete search history.

(56) References Cited

U.S. PATENT DOCUMENTS

| 3,018,543 A | 1/1962 | Beck |
| 3,036,369 A | 5/1962 | Wilkins |
| 3,839,975 A | 10/1974 | Tranel |
| 4,021,901 A * | 5/1977 | Kleine ...................... F28F 3/14 228/160 |

(Continued)

FOREIGN PATENT DOCUMENTS

| EP | 0614062 A2 | 9/1994 |
| GB | 500537 A | 2/1939 |
| JP | S57193248 A | 11/1982 |

OTHER PUBLICATIONS

French Search Report; priority document.

*Primary Examiner* — Christopher J Besler
(74) *Attorney, Agent, or Firm* — Greer, Burns & Crain, Ltd.

(57) ABSTRACT

A manufacturing method for a plate comprising channels in which the method includes a step of superposing the two strips, a step of welding the two strips along the weld seams, a step of blocking the zones between the weld seams on one side of the strips, a pressurization step with a compressed fluid, where the zones between the weld seams open out along another side, to expand the strips, and a step of opening the zones blocked during the blocking step. This manufacturing method enables the titanium strips to be welded together and shaped by pressurization.

2 Claims, 2 Drawing Sheets

(56) References Cited

U.S. PATENT DOCUMENTS

| | | | |
|---|---|---|---|
| 4,700,445 A | 10/1987 | Raskin | |
| 6,289,977 B1 * | 9/2001 | Claudel | F28D 9/0031 165/157 |
| 2011/0180237 A1 | 7/2011 | Hobbins | |
| 2020/0393069 A1 * | 12/2020 | Sachdev | B23K 26/206 |

* cited by examiner

MANUFACTURING METHOD FOR A TITANIUM HEAT EXCHANGER

CROSS-REFERENCES TO RELATED APPLICATIONS

This application claims the benefit of the French patent application No. 1913817 filed on Dec. 5, 2019, the entire disclosures of which are incorporated herein by way of reference.

FIELD OF THE INVENTION

The present invention relates to a manufacturing method for a heat exchanger.

BACKGROUND OF THE INVENTION

Heat exchangers are used to exchange calories between a hot fluid and a cold fluid such as a heat-transfer fluid. For this purpose, the heat exchanger takes the form of a plate traversed by a network of channels through which one of the fluids flows, while the other fluid is in contact with the surface of the plate.

Such a plate is usually made of stainless steel or graphite.

Although easy to make and efficient, such exchangers are relatively heavy. Such conditions may apply when the heat exchanger is installed in a fuel cell using dihydrogen and dioxygen.

SUMMARY OF THE INVENTION

One objective of the present invention is to propose a manufacturing method for a heat exchanger using titanium strips to provide a more lightweight heat exchanger with performance levels that are at least equivalent to the heat exchangers in the prior art. Furthermore, the methods proposed enable a heat exchanger to be obtained simply and quickly.

For this purpose, a manufacturing method for a plate with channels is proposed, the manufacturing method including:
- a superposition step during which two strips are superposed on one another,
- a welding step during which the two strips are welded together along weld seams,
- a blocking step during which the zones between the first strip and the second strip, where the zones between the weld seams open out at one of the edges of the first strip and of the second strip, are blocked,
- a pressurization step during which a compressed fluid is injected via another edge of the first strip and of the second strip, where the zones between the weld seams open out between the first strip and the second strip, to expand the strips, and
- an opening step during which the zones blocked during the blocking step are opened.

The invention also proposes a manufacturing method for a plate with channels, the manufacturing method including:
- a first positioning step during which a second strip is positioned on a first strip,
- a first welding step during which the edges of the two strips are welded together to form a closed volume,
- a pressurization step during which a compressed fluid is injected into the closed volume to inflate the closed volume,
- a second positioning step during which the inflated strips are positioned between a mold and a counter-mold, in which the mold has welding elements and negative forms, and in which the counter-mold has welding elements that are aligned with the welding elements of the mold and negative forms that are aligned with the negative forms of the mold,
- a clamping step during which the mold and the counter-mold are brought together so that the two strips are in contact along the welding elements and deformed in the negative forms, and
- a second welding step during which the welding elements are activated to weld the two strips together along the weld seams.

Each of the two manufacturing methods proposed herein enables the titanium strips to be welded together and shaped by pressurization.

According to a specific embodiment, the superposition step comprises successively a first positioning step during which the first strip is positioned on a base, a second positioning step during which the second strip is positioned on the first strip, and a covering step during which supporting parts that together form a welding channel are arranged on the second strip and the welding step involves moving a welding unit along the welding channel to weld the two strips together along the weld seams.

Advantageously, the manufacturing method includes a depositing step, between the first positioning step and the second positioning step, during which beads of a thermal insulator are deposited on the first strip, and the second positioning step involves positioning the second strip on the beads.

Advantageously, the manufacturing method involves a positioning step, between the blocking step and the pressurization step, during which the first welded strip and the second welded strip are positioned between two dies, each of which has negative forms corresponding to the imprints of the channels to be formed.

According to a specific embodiment, the superposition step comprises successively a first positioning step during which the first strip is positioned on a mold, a second positioning step during which the second strip is positioned on the first strip, and a covering step during which a counter-mold is positioned on the second strip, in which the mold and the counter-mold have a plurality of holes, and the welding step involves inserting needles into the holes of the mold and counter-needles into the holes of the counter-mold and powering the needles and the counter-needles using a voltage generator to weld the two strips together along the weld seams, and in which the mold and the counter-mold have negative forms between the holes corresponding to the imprints of the channels to be formed.

BRIEF DESCRIPTION OF THE DRAWINGS

The aforementioned and other features of the present invention are set out more clearly in the description given below of an example embodiment, said description being provided with reference to the attached drawings, in which.

DETAILED DESCRIPTION OF THE PREFERRED EMBODIMENTS

Figure 1:
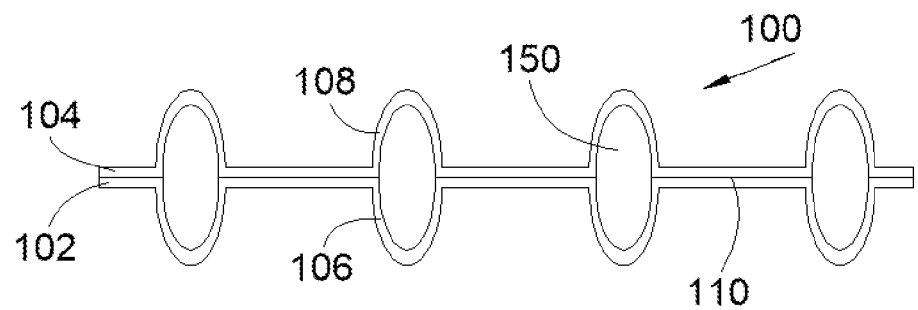
FIG. 1 is a cross-section view of a plate of a heat exchanger obtained using a manufacturing method according to the invention.

FIG. 1 shows a plate 100 that can be used in a heat exchanger and that has a first strip 102 and a second strip 104. The two strips 102 and 104 are made of titanium or titanium alloy.

The two strips 102 and 104 are attached to one another.

Each strip 102, 104 has deformations 106, 108, in this case elliptical arcs. Each deformation 106 of the first strip 102 faces a deformation 108 of the second strip 104 to form a channel 150 therebetween that can be used to channel a fluid, in particular a heat-transfer fluid, when the plate 100 is used in a heat exchanger.

The shape of the deformations 106, 108 can vary and, for example, be trapezoidal, omega-shaped, circular or triangular.

The plate 100 is then placed between a supply system that feeds the plate 100 with the heat-transfer fluid, and a recovery system that recovers the heat-transfer fluid coming out of the plate 100. The fluid continuity between the supply system and the plate 100 occurs at a first edge of the plate 100 and the fluid continuity between the plate 100 and the recovery system occurs at a second edge of the plate 100, i.e., the channels 150 are open at this first edge and at this second edge to enable flow of the heat-transfer fluid.

The two strips 102 and 104 are fastened to one another by spot welds 110 made between two neighboring deformations 106, 108.

Making such a plate 100 from titanium provides a more lightweight heat exchanger that is equally efficient, in particular when used in a cooling system of a fuel cell.

Figure 2:
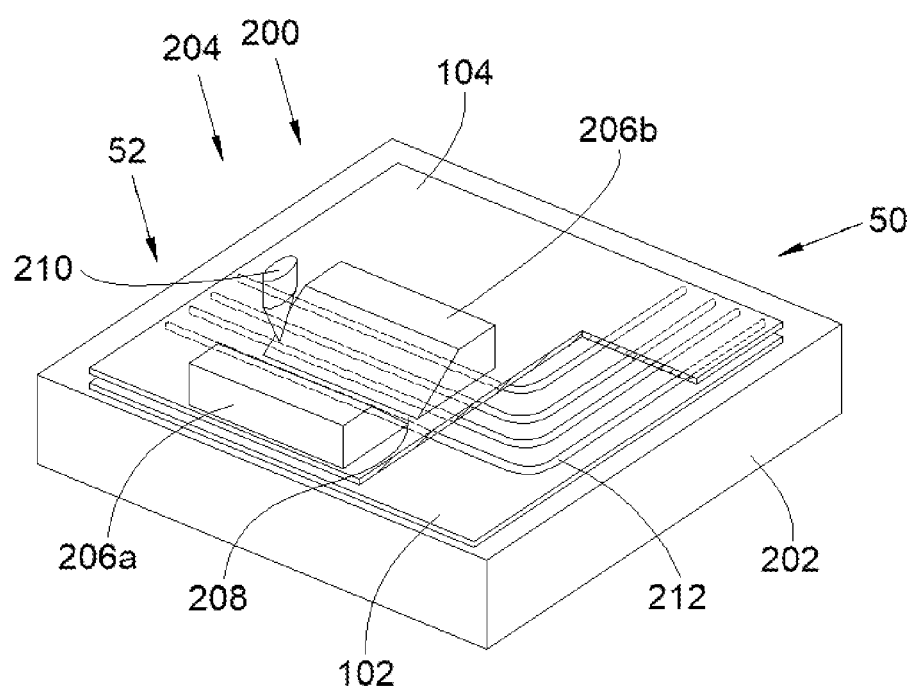
FIG. 2 is a perspective view of a tool used as part of a manufacturing method according to a first embodiment of the invention.

FIG. 2 shows a tool 200 used to shape two strips 102 and 104 of titanium or titanium alloy into the plate 100 as part of a method according to a first embodiment of the invention. For the sake of clarity in the figures, the second strip 104 is partially cut-away.

The tool 200 has a base 202 and a welding tool 204. The welding tool 204 in this case includes supporting parts 206*a-b* delimiting a welding channel 208 therebetween and a welding unit 210 that moves along the welding channel 208, for example using a moving carriage.

The welding unit 210 is for example a laser emitter used for laser welding, but any other technique can be used such as electron-beam welding, electric resistance welding, friction stir welding or diffusion welding.

Once a weld seam has been formed, the supporting parts 206*a-b* and the welding unit 210 are moved to form a new weld seam.

The two strips 102 and 104 are arranged on top of one another and between the base 202 and the welding tool 204, and more specifically in this case between the base 202 and the supporting parts 206*a-b*.

Once the welding unit 210 has completed all of the weld seams, the zones between the weld seams, i.e. zones in which the two strips 102 and 104 are not welded together, are deformed and will ultimately form the channels 150 of the plate 100.

As mentioned above, some channels 150 enable flow of the heat-transfer fluid penetrating the plate 100 or coming out of the plate 100 and these channels 150 open out respectively at a first edge 50 of the plate 100 and at a second edge 52 of the plate 100, which are respectively the first edges of the first strip 102 and of the second strip 104, and at the second edges of the first strip 102 and of the second strip 104.

The zones between the weld seams are used to create these channels 150 that open out at the edges 50 and 52 and therefore extend respectively as far as the first edge 50 of the plate 100 and as far as the second edge 52 of the plate 100.

In order to form the channels 150, a pressurized fluid is injected between the strips 102 and 104 into the zones between the weld seams, and the two strips 102 and 104 are then separated from one another in these zones to form the channels 150. In order to inject the pressurized fluid, the zones between the first strip 102 and the second strip 104 at one of the edges 50, 52 of the first strip 102 and of the second strip 104, along which the zones between the weld seams open at one of the ends thereof, need to be blocked. The pressurized fluid is then injected via the other edge 52, 50 of the first strip 102 and of the second strip 104, along which the zones between the weld seams open at the other ends thereof.

To ensure that the channels 150 are properly formed, before injection of the pressurized fluid, the first strip 102 and the second strip 104 are positioned between two dies, in which each die has negative forms corresponding to the imprints of the channels 150 to be formed. Thus, during injection of the compressed fluid, the strips 102 and 104 are separated from one another to fit the negative forms, thereby forming the channels 150. The negative forms are made on the faces of the dies arranged against the strips 102 and 104.

The previously blocked zones are then opened to enable the fluid to flow into the channels 150 of the plate 100.

A manufacturing method for a plate 100 of a heat exchanger according to the first embodiment comprises:
- a first positioning step during which a first strip 102 is positioned on the base 202,
- a second positioning step during which a second strip 104 is positioned on the first strip 102,
- a covering step during which the supporting parts 206*a-b* are positioned on the second strip 104,
- a welding step during which the welding unit 210 is moved along the welding channel 208 to weld the two strips 102 and 104 together along weld seams,
- a blocking step during which the zones between the first strip 102 and the second strip 104, where the zones between the weld seams open out at one of the edges 50, 52 of the first strip 102 and of the second strip 104, are blocked,
- a third positioning step during which the first welded strip 102 and the second welded strip 104 are positioned between two dies, each having negative forms,
- a pressurization step during which the compressed fluid is injected via another edge 52, 50 of the first strip 102 and of the second strip 104, where the zones between the weld seams open out between the first strip 102 and the second strip 104, to expand the strips 102 and 104 into the negative forms, and
- an opening step during which the zones blocked during the blocking step are opened.

The welding step is repeated for each weld seam following movement of the supporting parts 204*a-b* to obtain the desired layout of the channels 150. Such a method is relatively simple and rapid to implement.

The blocking step can be carried out during the welding step.

To improve the precision of the welds, i.e., to prevent the two strips 102 and 104 from being welded together over too large a surface, beads 212 of an electrical and thermal insulator are deposited between the two strips 102 and 104 at the locations where no weld is to be provided between the two strips 102 and 104, i.e., in the zone between the weld seams. The beads 212 are, for example, made of ceramic powder.

The zones where the beads 212 are deposited ultimately become the channels 150 of the plate 100.

The beads 212 extend up to the first edge 50 of the plate 100 and up to the second edge 52 of the plate 100 as for the zones between the weld seams.

The manufacturing method then includes a depositing step, between the first positioning step and the second positioning step, during which beads 212 of an insulator are deposited on the first strip 102 and in which the beads 212 extend between two edges of the first strip 102, and the second positioning step then involves positioning the second strip 104 on the beads 212 and in which the beads 212 extend between two edges of the second strip 104.

If necessary, the insulator beads 212 can be removed by injecting an appropriate fluid into the channels 150.

Figure 3:
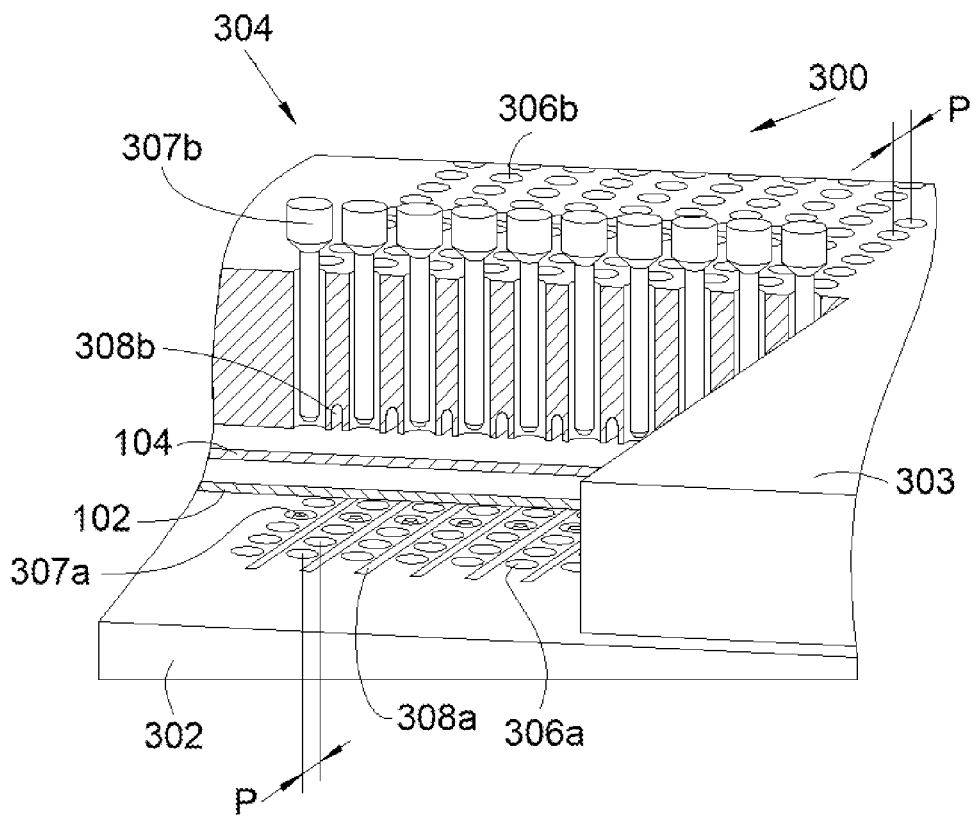
FIG. 3 is a perspective view of a tool used as part of a manufacturing method according to a second embodiment of the invention.

FIG. 3 shows a tool 300 used to shape two strips 102 and 104 made of titanium or titanium alloy into the plate 100 as part of a method according to a second embodiment of the invention.

The tool 300 comprises a mold 302 forming a base in this case, a counter-mold 303 that is positioned above the mold 302, and a welding tool 304.

The two strips 102 and 104 are arranged between the mold 302 and the counter-mold 303.

The mold 302 and the counter-mold 303 include a plurality of holes 306a-b, and the axes of the holes 306a-b are perpendicular to the planes of the strips 102 and 104.

The welding tool 304 has a plurality of needles 307a in which each needle 307a is inserted into a hole 306a of the mold 302 and a plurality of counter-needles 307b in which each counter-needle 307b is inserted into a hole 306b of the counter-mold 303.

The needles 307a can be arranged to face the counter-needles 307b. It is nonetheless possible for the needles 307a to be staggered in relation to the counter-needles 307b.

The welding tool 304 also includes a voltage generator that powers the needles 307a and the counter-needles 307b to generate a welding arc between the strips 102 and 104 and each needle 307a or each counter-needle 307b.

In the embodiment of the invention shown in FIG. 3, the welding tool 304 has a row of needles 307a and a row of counter-needles 307b, although more rows of needles 307a and counter-needles 307b can be provided, and the desired number of needles 307a and counter-needles 307b can be electrically powered.

In the embodiment shown in FIG. 3, the holes 306a of the mold 302 are offset linearly in relation to one another by a step P and the holes 306b of the counter-mold 303 are also offset linearly in relation to one another by the same step P, and the holes 306a of the mold 302 and the holes 306b of the counter-mold 303 are offset linearly in relation to one another by a half-step P such that a hole 306b of the counter-mold 303 is equidistant from two consecutive holes 306a of the mold 302 and vice versa. The step P extends parallel to the direction of the weld seams to be made.

A spot weld is made at each needle 307a and each counter-needle 307b and it is possible to make a succession of spot welds that will ultimately form the weld seams by successively moving the needles 307a and the counter-needles 307b. The offsetting of the needles 307a and of the counter-needles 307b makes it possible to make a weld on the side of the first strip 102, then on the side of the second strip 104.

The weld seam is formed by a succession of spot welds made alternately by the needles 307a and the counter-needles 307b.

Once the welding tool 304 has completed all of the weld seams, the zones between the weld seams, i.e., the zones in which the two strips 102 and 104 are not welded together, are deformed and will ultimately form the channels 150 of the plate 100.

As in the first embodiment, the zones between the weld seams are used to create these channels 150 that open out at the edges of the strips 102 and 104 and therefore extend respectively as far as the first edge of the plate 100 and as far as the second edge of the plate 100.

In order to form the channels 150, a pressurized fluid is injected between the strips 102 and 104 into the zones between the weld seams, and the two strips 102 and 104 are then separated from one another in these zones to form the channels 150. In order to inject the pressurized fluid, the zones between the first strip 102 and the second strip 104 at one of the edges of the first strip 102 and of the second strip 104, along which the zones between the weld seams open at one of the ends thereof, need to be blocked. The pressurized fluid is then injected via the other edge of the first strip 102 and of the second strip 104 along which the zones between the weld seams open at the other ends thereof.

In order to correctly form the channels 150, the mold 302 and the counter-mold 303 have negative forms 308a-b between the holes 306a-b corresponding to the imprints of the channels 150 to be formed. Thus, during injection of the compressed fluid, the strips 102 and 104 are separated from one another to fit the negative forms 308a-b, thereby forming the channels 150. The negative forms 308a-b are made on the faces of the mold 302 and of the counter-mold 303 arranged against the strips 102 and 104.

The previously blocked zones are then opened to enable the fluid to flow into the channels 150 of the plate 100.

A manufacturing method for a plate 100 of a heat exchanger according to a first embodiment comprises:
 a first positioning step during which a first strip 102 is positioned on the mold 302,
 a second positioning step during which a second strip 104 is positioned on the first strip 102,
 a covering step during which the counter-mold 303 is positioned on the second strip 104,
 a welding step during which the needles 307a are inserted into the holes 306a of the mold 302 and the counter-needles 307b are inserted into the holes 306b of the counter-mold 303, and the needles 307a and the counter-needles 307b are powered using the voltage generator to weld the two strips 102, 104 together along the weld seams,
 a blocking step during which the zones between the first strip 102 and the second strip 104, where the zones between the weld seams open out at one of the edges of the first strip 102 and of the second strip 104, are blocked,
 a pressurization step during which a compressed fluid is injected via another edge of the first strip 102 and of the second strip 104, where the zones between the weld seams open out between the first strip 102 and the second strip 104, to expand the strips 102 and 104 into the negative forms, and
 an opening step during which the zones blocked during the blocking step are opened.

The welding step is repeated for each weld seam following movement of the needles 307a and the counter-needles 307b or by successive activation of several rows of needles 307a and of counter-needles 307b.

The manufacturing method common to the first embodiment in FIG. 2 and to the second embodiment in FIG. 3 comprises successively:
- a superposition step during which the two strips 102, 104 are superposed on one another,
- a welding step during which the two strips 102 and 104 are welded together along weld seams,
- a blocking step during which the zones between the first strip 102 and the second strip 104, where the zones between the weld seams open out at one of the edges 50, 52 of the first strip 102 and of the second strip 104, are blocked,
- a pressurization step during which a compressed fluid is injected via another edge 52, 50 of the first strip 102 and of the second strip 104, where the zones between the weld seams open out between the first strip 102 and the second strip 104, to expand the strips 102, 104, and
- an opening step during which the zones blocked during the blocking step are opened.

In the first embodiment, the superposition step comprises successively the first positioning step during which a first strip 102 is positioned on the base 202, the second positioning step during which a second strip 104 is positioned on the first strip 102, and the covering step during which the supporting parts 206a-b are arranged on the second strip 104. The welding step then comprises a movement of the welding unit 210 along the welding channel 208 to weld the two strips 102 and 104 together along the weld seams.

In the second embodiment, the superposition step comprises successively the first positioning step during which a first strip 102 is positioned on the mold 302, the second positioning step during which a second strip 104 is positioned on the first strip 102, and the covering step during which the counter-mold 303 is positioned on the second strip 104.

Figure 4:
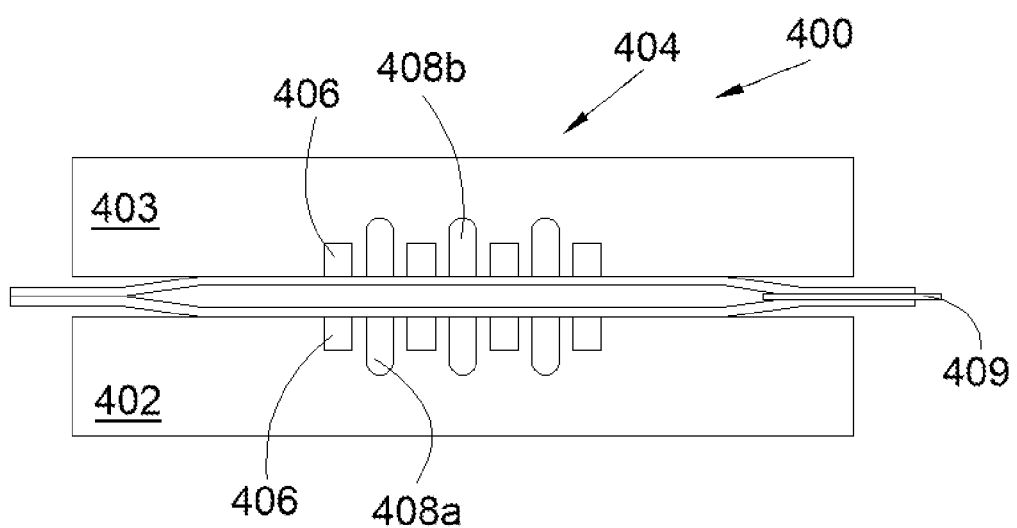
FIG. 4 is a cross-section view of a tool used as part of a manufacturing method according to a third embodiment of the invention.

FIG. 4 shows a tool 400 used to shape two strips 102 and 104 made of titanium or titanium alloy into the plate 100 as part of a method according to a third embodiment of the invention.

The tool 400 comprises a mold 402 forming a base in this case, a counter-mold 403 that is positioned above the mold 402, and a welding tool 404.

The two strips 102 and 104 are arranged between the mold 402 and the counter-mold 403.

The mold 402 and the counter-mold 403 have a plurality of welding elements 406, such as resistive heating elements, which are aligned in several rows, and the welding elements 406 of the mold 402 and of the counter-mold 403 are aligned, in this case vertically.

The welding tool 404 has a plurality of welding elements 406 distributed in rows on the mold 402 and the counter-mold 403 and a current generator that powers the welding elements 406 to create an electrical arc that generates a temperature increase that welds the strips 102 and 104 together.

A weld seam is made at each row of welding elements 406.

The mold 402 and the counter-mold 403 also have negative forms 408a-b corresponding to the imprints of the channels 150 to be formed.

The welding elements 406 and the negative forms 408a-b are made on the faces of the mold 402 and of the counter-mold 403 arranged against the strips 102 and 104.

The manufacturing principle of the plate 100 involves welding all of the edges of the two strips 102 and 104 together in order to create a closed volume therein. A pressurized fluid is then injected into this closed volume, for example through a pipe 409 opening into the closed volume. The mold 402 and the counter-mold 403 are then brought together to force contact between the two strips 102 and 104 between the welding elements 406. During this step, the pipe 409 is blocked to prevent the pressurized fluid from leaking out and at the same time, by maintaining the volume of the pressurized fluid in the closed volume, the strips 102 and 104 are deformed into the negative forms 408a-b in order to form the channels 150. The welding elements 406 are then activated to weld the two strips 102 and 104 along the weld seams. The ends of the channels 150 through which the heat-transfer fluid flows are then opened, for example by cutting the edges of the strips 102 and 104.

Once the welding tool 404 has completed all of the weld seams, the zones between the weld seams, i.e., the zones in which the two strips 102 and 104 are not welded together and have therefore been deformed, form the channels 150 of the plate 100.

After the ends of the channels 150 have been opened, the zones between the weld seams open out at the edges of the strips 102 and 104 and therefore extend respectively as far as the first edge of the plate 100 and as far as the second edge of the plate 100.

A manufacturing method for a plate 100 of a heat exchanger according to a third embodiment comprises successively:
- a first positioning step during which the second strip 104 is positioned on the first strip 102,
- a first welding step during which the edges of the two strips 102 and 104 are welded together to form a closed volume,
- a pressurization step during which a compressed fluid is injected into the closed volume to inflate the closed volume,
- a second positioning step during which the inflated strips 102, 104 are positioned between a mold 402 and a counter-mold 403 in which the mold 402 has welding elements 406 and negative forms 408a, and in which the counter-mold 403 has welding elements 406 that are aligned with the welding elements 406 of the mold 402 and negative forms 408b that are aligned with the negative forms 408a of the mold 402,
- a clamping step during which the mold 402 and the counter-mold 403 are brought together so that the two strips 102 and 104 are in contact along the welding elements 406 and deformed in the negative forms 408a-b, and
- a second welding step during which the welding elements 406 are activated to weld the two strips 102, 104 together along the weld seams.

The pressurized fluid can, for example, be air, oil or any other appropriate fluid.

Such heat exchangers 100 can be stacked to fasten the deformations 106, 108 of a heat exchanger 100 and to bring same into contact with the deformations 108, 106 of another heat exchanger 100 arranged on top in order to create open channels that are delimited by the deformations 106 and 108 of the two heat exchangers 100 and the welded zones, i.e. the zones between the channels 150. Thus, in the context of a fuel cell, a coolant liquid can flow through the channels 150 to provide the heat exchange function, while air and hydrogen can flow through the open channels thus formed.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A manufacturing method for a plate with channels, the manufacturing method including:
   a superpositioning step during which a first and a second strip are superposed on one another,
   a welding step during which the first and second strips are welded together along a plurality of weld seams,
   a blocking step during which zones between the first strip and the second strip, where the zones between adjacent weld seams of the plurality of weld seams open out at one edge of the first strip and one edge of the second strip, are blocked,
   a pressurizing step during which a compressed fluid is injected via another edge of the first strip and of the second strip, where the zones between the adjacent weld seams of the plurality of weld seams open out between the first strip and the second strip, to expand the two strips, and
   an opening step during which the zones blocked during the blocking step are opened,
   wherein the superposition step comprises successively:
   a first positioning step during which the first strip is positioned on a base,
   a second positioning step during which the second strip is positioned on the first strip, and
   a covering step during which supporting parts that together form a first welding channel are arranged on the second strip,
   wherein the welding step involves moving a welder along the first welding channel to weld the two strips together along a first weld seam of the plurality of weld seams, and
   wherein the supporting parts are moved after the first weld seam is formed to form a second weld channel on the second strip, and
   wherein the welding step further involves moving the welder along the second welding channel to weld the two strips together along a second weld seam of the plurality of weld seams,
   wherein the method includes a depositing step, between the first positioning step and the second positioning step, during which beads of a thermal insulator are deposited on the first strip, and wherein the second positioning step involves positioning the second strip on the beads.

2. The manufacturing method according to claim 1, wherein the method involves a positioning step, between the blocking step and the pressurization step, during which the first welded strip and the second welded strip are positioned between two dies, each of which has negative forms corresponding to imprints of the channels to be formed.

* * * * *